(12) United States Patent
McCreight et al.

(10) Patent No.: US 12,271,366 B2
(45) Date of Patent: Apr. 8, 2025

(54) SYSTEM AND METHOD FOR GENERATING, MAINTAINING, AND QUERYING A DATABASE FOR COMPUTER INVESTIGATIONS

(71) Applicant: OPEN TEXT HOLDINGS, INC., Menlo Park, CA (US)

(72) Inventors: Shawn McCreight, Pasadena, CA (US); Roger Angarita, South Pasadena, CA (US); Chris Petrus, Reseda, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 18/531,297

(22) Filed: Dec. 6, 2023

(65) Prior Publication Data

US 2024/0104079 A1   Mar. 28, 2024

Related U.S. Application Data

(63) Continuation of application No. 16/782,202, filed on Feb. 5, 2020, now Pat. No. 11,899,643, which is a continuation of application No. 15/162,591, filed on May 23, 2016, now Pat. No. 10,585,869.

(60) Provisional application No. 62/165,868, filed on May 22, 2015.

(51) Int. Cl.
G06F 16/22     (2019.01)
G06F 16/28     (2019.01)

(52) U.S. Cl.
CPC .......... *G06F 16/2282* (2019.01); *G06F 16/28* (2019.01)

(58) Field of Classification Search
CPC .................................................. G06F 16/2282
See application file for complete search history.

(56) References Cited

U.S. PATENT DOCUMENTS

| | | | |
|---|---|---|---|
| 8,386,509 B1 * | 2/2013 | Scofield | G06F 16/9535 707/706 |
| 2013/0311518 A1 * | 11/2013 | Agbaria | G06F 16/2365 707/E17.044 |
| 2015/0112998 A1 * | 4/2015 | Shankar | G06F 16/248 707/798 |
| 2016/0148093 A1 * | 5/2016 | Adderly | G06N 5/022 706/46 |

* cited by examiner

*Primary Examiner* — Van H Oberly
(74) *Attorney, Agent, or Firm* — Sprinkle IP Law Group

(57) ABSTRACT

A computer investigation system and method organize information in a hive. Information in a target device is parsed by a processor, and facts and links are extracted from the data. The processor identifies the fact type for each identified fact, and further generates a fact ID for the fact. The information for the fact is stored in the hive in a fact table associated with the fact type. The processor also identifies the link type for each identified link, and further generates a link ID for the link. The information for the link ID is stored in the hive in a link table associated with the identified link type. A query language that is adapted to work with the hive allows querying of data stored in the hive.

20 Claims, 16 Drawing Sheets

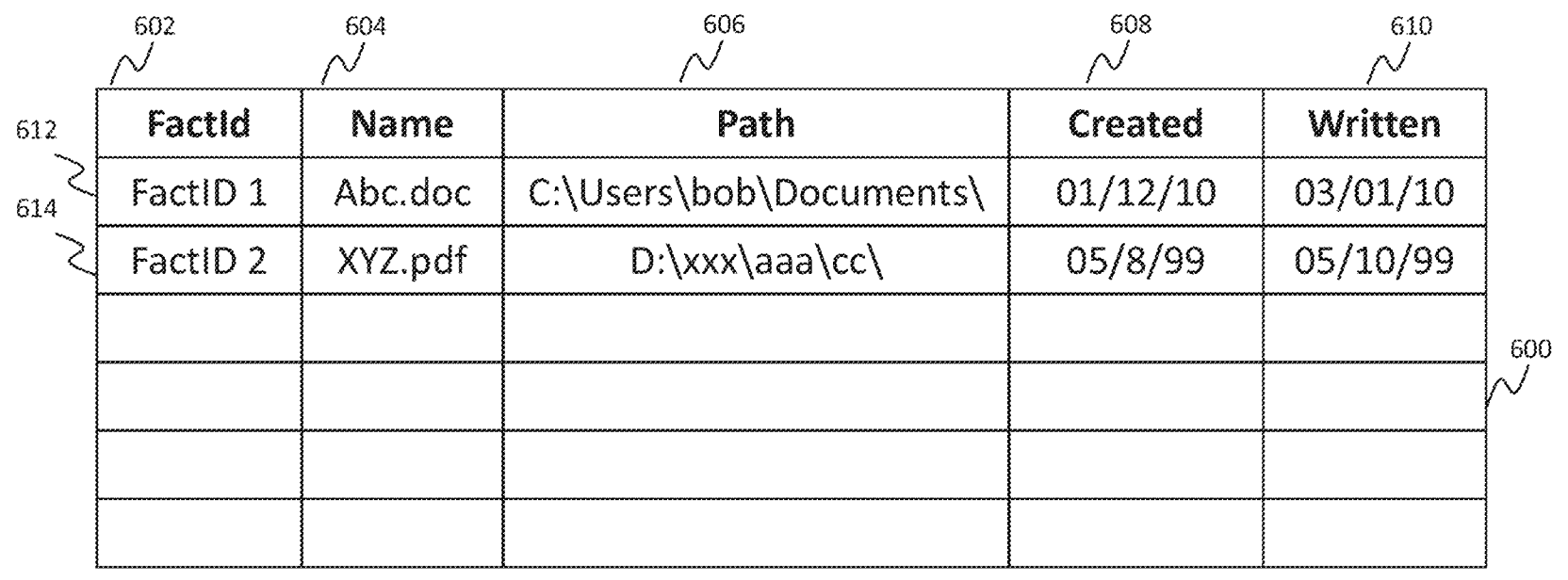

| FactId | Name | Path | Created | Written |
|---|---|---|---|---|
| FactID 1 | Abc.doc | C:\Users\bob\Documents\ | 01/12/10 | 03/01/10 |
| FactID 2 | XYZ.pdf | D:\xxx\aaa\cc\ | 05/8/99 | 05/10/99 |
| | | | | |
| | | | | |
| | | | | |

FIG. 7A

| FactId | Text | Length |
|---|---|---|
| FactID 1 | Question | 8 |
| FactID 2 | Can we move our meeting to tomorrow? | 36 |
| | | |
| | | |
| | | |

FIG. 7B

SYSTEM AND METHOD FOR GENERATING, MAINTAINING, AND QUERYING A DATABASE FOR COMPUTER INVESTIGATIONS

CROSS-REFERENCE TO RELATED APPLICATIONS

This application is a continuation of, and claims a benefit of priority under 35 U.S.C. 120 of the filing date of U.S. patent application Ser. No. 16/782,202, filed Feb. 5, 2020, issued as U.S. Pat. No. 11,899,643, entitled "SYSTEM AND METHOD FOR GENERATING, MAINTAINING, AND QUERYING A DATABASE FOR COMPUTER INVESTIGATIONS," which is a continuation of, and claims a benefit of priority under 35 U.S.C. 120 of the filing date of U.S. patent application Ser. No. 15/162,591, filed May 23, 2016, issued as U.S. Pat. No. 10,585,869, entitled "SYSTEM AND METHOD FOR GENERATING, MAINTAINING, AND QUERYING A DATABASE FOR COMPUTER INVESTIGATIONS," which claims a benefit of priority under 35 U.S.C. § 119 from U.S. Provisional Patent Application No. 62/165,868, filed May 22, 2015, entitled "SYSTEM AND METHOD FOR GENERATING, MAINTAINING, AND QUERYING A DATABASE FOR COMPUTER INVESTIGATIONS", the entire contents of which are hereby expressly incorporated by reference for all purposes.

FIELD OF THE INVENTION

This invention relates generally to computer investigation systems, and more specifically, to a computer investigation system having a database that is structured for querying by investigators using a query language that may be understood by even non-programmers.

BACKGROUND

Computer investigation has become increasingly important as the use of computers has extended to virtually all areas of everyday life. Computer investigation may include, for example, computer forensics which entails the collection, preservation, and analysis of computer-related evidence. Computer-related evidence is increasingly being used for court trials and police investigations.

The gathering of desired information during a computer investigation session often requires generating machine-readable search queries. Such machine-readable search queries describe the information that is sought to be retrieved from a target machine. However, the generating of search queries using a traditional query language is often confusing and complicated for non-programmers. For example, traditional search queries may require multiple Boolean expressions, multiple levels of parenthesis, and the like. Traditional search queries are therefore hard for a human with little or no programming experience to interpret and understand.

SUMMARY

Embodiments of the present invention are directed to a method for conducting a computer investigation. The method includes identifying, by a processor, information stored in a data storage device. The processor parses or scans the identified information, and identifies a first piece of data associated with a first data type. The processor also identifies a second piece of data associated with a second data type. The processor computes a first unique identifier for the first piece of data and a second unique identifier for the second piece of data. The first unique identifier and first metadata for the first piece of data, are stored in a first table associated with the first data type. Similarly, the second unique identifier and second metadata for the second piece of data, are stored in a second table associated with the second data type. The processor identifies a link between the first piece of data and the second piece of data, and computes a third unique identifier for the link. The processor stores the link in a third table. The processor further outputs the first or second metadata in response to a query.

According to one embodiment, the data storage device is identified as a subject of a computer investigation.

According to one embodiment, the first and second pieces of data are facts. The facts may be selected from a group consisting of person, email, email address, host, and data segment.

According to one embodiment, the link is an association between the first piece of data and the second piece of data.

According to one embodiment, the first and second identifiers are first and second values that depend respectively on the first and second metadata.

According to one embodiment, the third identifier is computed based on the first and second identifiers.

Embodiments of the present invention are also directed to a method for querying a database comprising tables stored in a data storage device. The method includes receiving a search query describing a filter, wherein the filter includes a plurality of conditions, wherein each of the conditions is enclosed in a gate ending with a particular punctuation mark; processing, by the processor, the search query, wherein in processing the search query, the processor searches the tables in the data storage device for identifying a match for each of the conditions; and returning, by the processor, the search results in response to identifying the match for each of the conditions.

According to one embodiment, a first one of the tables includes entries for facts of a first type, wherein each entry includes a unique identifier and metadata for the fact.

According to one embodiment, the unique identifier for a particular fact is based on the metadata of the particular fact.

According to one embodiment, a second one of the tables includes entries for links associating a first fact in the first table with a second fact in a second table, the second table include entries for facts of a second type.

BRIEF DESCRIPTION OF THE DRAWINGS

FIGS. 7A-7B are layout diagrams of two exemplary fact tables that may be stored in the hive according to one embodiment of the invention;

DETAILED DESCRIPTION

In general terms, the present invention is directed to a system and method for generating, maintaining, and querying a database for computer investigations. The database (hereinafter referred to as a hive) stores all data as either a unique fact or a unique link. Specific types of facts and links are defined by the system as such. None of the information that is stored is stored in any tree structure. Instead, all facts are stored at a same level, and connected to other facts via one or more links.

According to one embodiment, the hive is queried via a query language (hereinafter referred to as an enterprise query language) (EQL) that allows, for example, the creating of search queries that avoid many complexities and is more organized and structured than traditional query languages. The search queries generated using EQL are both machine readable and human readable. EQL allows various different fact types to be queried—not just emails and documents. The resulting search query is a simple text file that is interpreted by an investigative computer for conducting search of data stored in one or more target machines. According to one embodiment, having a language that allows even non-programmers to use the query language for computer investigations avoids mistakes that may occur in translating a search query provided in plain English by an investigator, into a database query, generated by a programmer, using a database query language for being processed by a database server.

Figure 1:
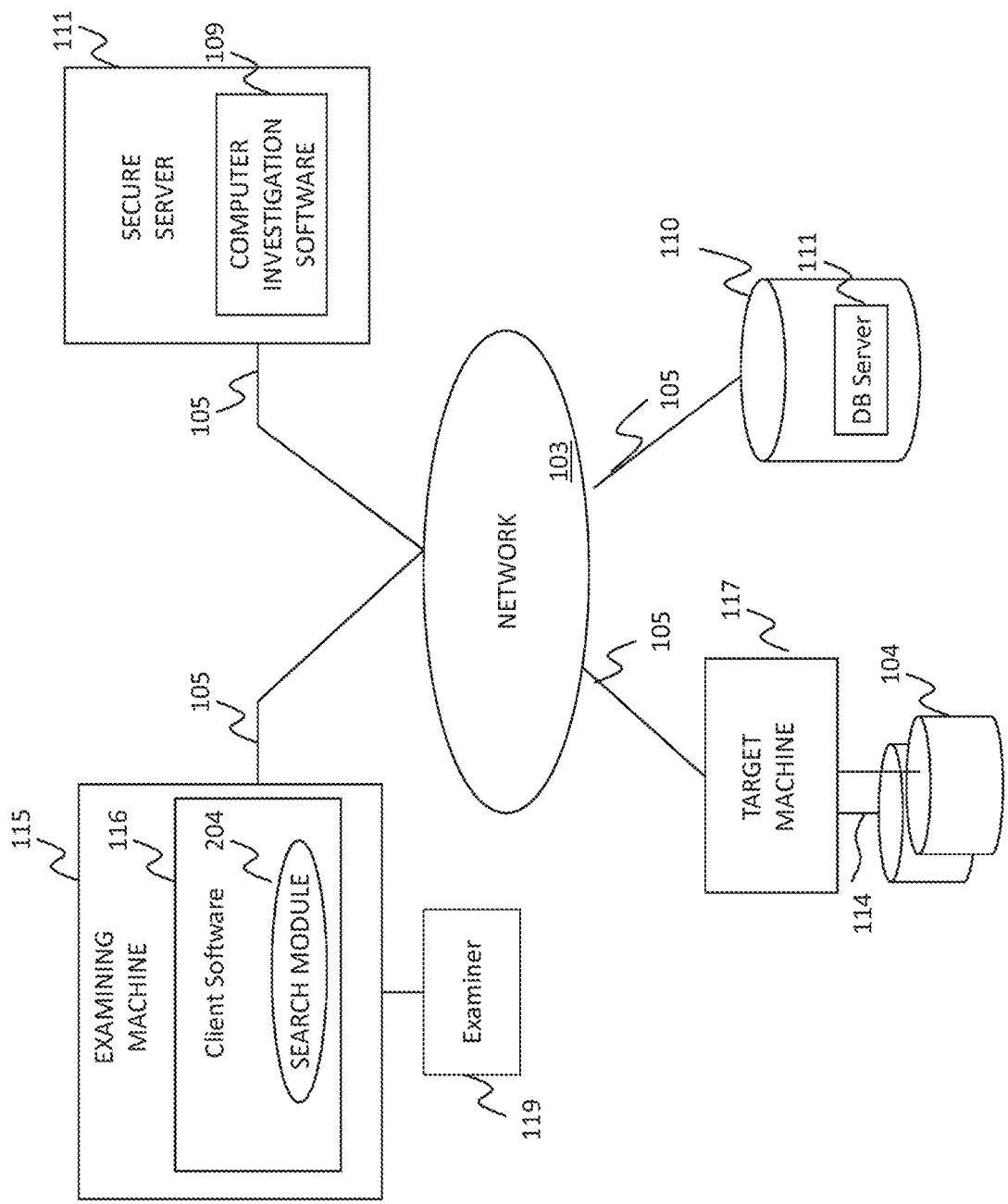
FIG. 1 is a schematic block diagram of a computer investigation system according to one embodiment of the invention.

FIG. 1 is a schematic block diagram of a computer investigation system according to one embodiment of the invention. The computer investigation system 101 includes various network devices coupled to a data communications network 103 over data communication links 105. The data communications network 103 may be a computer network, such as, for example, a public Internet, a private wide area network (WAN), a local area network (LAN), or other network environment conventional in the art. The network devices may include a secure server 111, an examining machine 115, one or more target machines 117, and a hive 110. The data communication link 105 may be any network link conventional in the art, such as, for example, an Ethernet coupling.

According to one embodiment, the secure server 111 hosts a computer investigation software 109 which enables the organization to effectively perform forensic investigations, respond to network safety alerts, and conduct network audits over the data communications network 103. The computer investigation software 109 may also allow other investigations of networked devices in addition to forensic investigations as evident to those of skill in the art.

The examining machine 115 (which may also be referred to as the client) allows an authorized examiner 119 to conduct searches of the target machines 117. In this regard, the examining machine 115 includes a client software 116 which includes the functionality and interoperability for remotely accessing the secure server 111 and corresponding target machines 117. According to one embodiment of the invention, the client software 116 includes a search module 204 that provides a user interface for allowing users to generate search queries using EQL. The search module 204 may be implemented as a software module that is executed by one or more processors resident in the examining machine 115, and may include one or more submodules dedicated to different aspects of the search and/or user interface. Furthermore, the search module 204 may be included as part of the client software 109, or reside as a module separate from the client software.

Each target machine 117 is exemplarily the subject of a computer investigation conducted by the examining machine 115. Each target machine 117 is coupled to one or more secondary storage devices 104 over an input/output connection 114. The storage devices include any nonvolatile storage media such as, for example, hard disks, diskettes, Zip drives, redundant array of independent disks (RAID) systems, holographic storage devices, and the like.

According to one embodiment, information extracted from the data stored in the various storage devices 104 are organized and stored in a disk or disk array 110 that hosts the hive. According to one embodiment, the storing and retrieval of data to and from the hive is controlled by an associated database server 111. According to one embodiment, the hive is structured as a hyper-relational database. In this regard, the examining machine 115, secure server 111, or other processing device, processes the data stored in the various storage devices 104, extracts facts and links from the data, and stores the extracts facts and links in various tables of the hive. The software for interacting with the database server 111 to populate the hive may be part of the computer investigation software 109, search module 204, software running in the target machines 117, or the like.

The computer investigation system 101 illustrated in FIG. 1 also includes an examiner 119 who has direct or remote access to the examining machine 115 in any manner conventional in the art. The direct access may enable the examiner 119 to generate, for example, desired EQL search queries for searching the hive in conducting an investigation of the target machines 117. According to one embodiment, EQL is configured to take advantage of the unique organizational structure of the hive in providing the commands and structure of the EQL query language.

Figure 2:
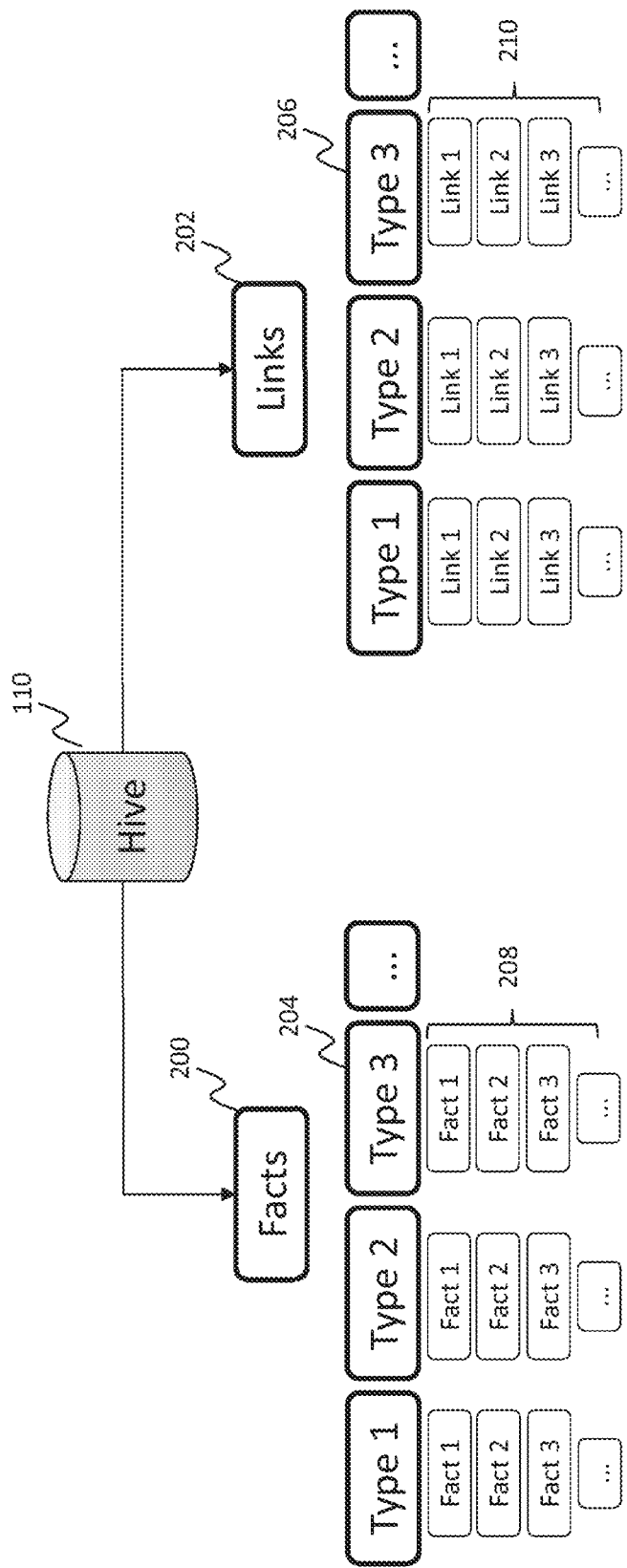
FIG. 2 is a more detailed data architecture diagram of the hive 110 according to one embodiment of the invention.

FIG. 2 is a more detailed data architecture diagram of the hive 110 according to one embodiment of the invention. According to one invention, the hive contains discrete pieces of data referred to as facts 200 and links 202. In this regard, a separate table is stored in the hive for each data type (e.g. fact type 204 or link type 206). According to one embodiment, all data that is stored in the hive is broken down as either a fact or a link. Many instances 208, 210 of each fact 204 and link type 206 may be stored in the hive in a table for the corresponding fact or link type. According to one embodiment, no two instances of a fact or a link in a particular table, are the same. Each fact may be identified via a unique identifier referred to as a fact ID. According to one embodiment, the fact IDs may be used to create a link between facts. The links are stored in a link table and identified by another unique identifier referred to as a link ID.

Figure 3:
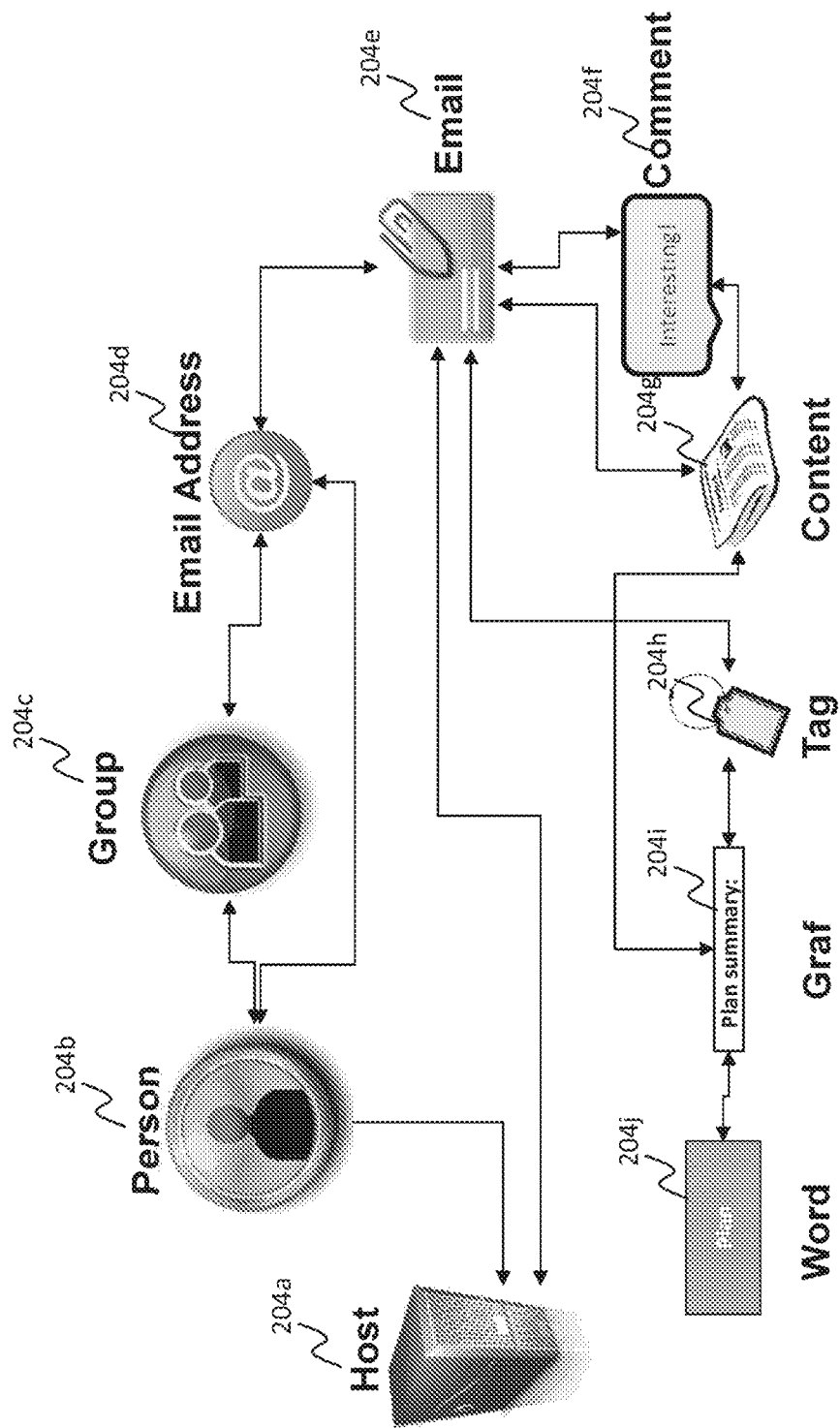
FIG. 3 is a conceptual layout diagram of various fact types that may connected via links according to one embodiment of the invention.

FIG. 3 is a conceptual layout diagram of various fact types 204a-204j that may connect via links according to one embodiment of the invention. Example fact types include a host 204a, person 204b, group of people 204c, email address 204d, email204e, comment 204f, content 204j, tag 204h, graf204i, and word 204j. According to one embodiment, all facts are on the same level. There is no hierarchical relationship between the facts. There are only links between facts at the same level. In other words, the facts represent the "nodes" and the links represent bi-directional "edges" in a network graph.

According to one embodiment, links represent relationships between facts. For example, considering a person or group fact, instead of considering a particular group as a piece of metadata belonging to a particular person, or considering the particular group as having a sublist of members that are people, people and groups are considered as distinct facts that are joined by links. For example, an instance of a person fact may be linked to an instance of a group fact by a member link.

Figure 4:
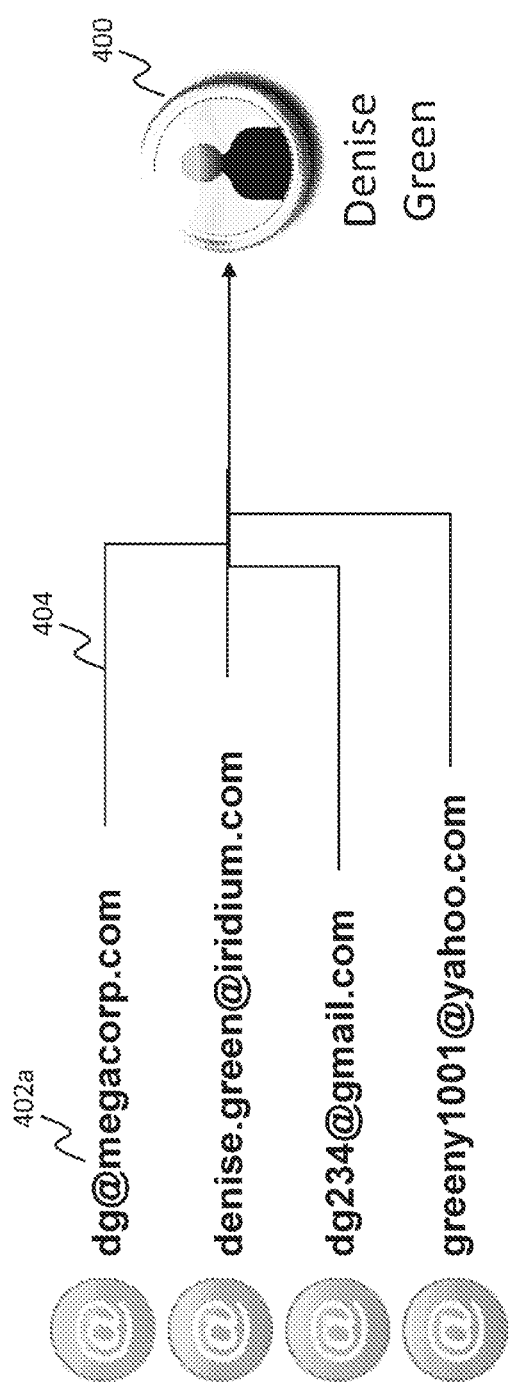
FIG. 4 is a conceptual diagram of an instance of a person fact linked to an instance of a n email address fact according to one embodiment of the invention.

In another example, as depicted in FIG. 4, an instance of a person fact (e.g. Denise Green) 400 may be linked to an instance of an email addressfact(e.g.dg@megacorp.com) 402a, by an instance of a link 404 having the type Person-EmailAddress link. In the Denise Green example, each new email address found for Denise Green during, for example, an investigation session, is added to the email address table and linked to the person Denise Green.

Figure 5:
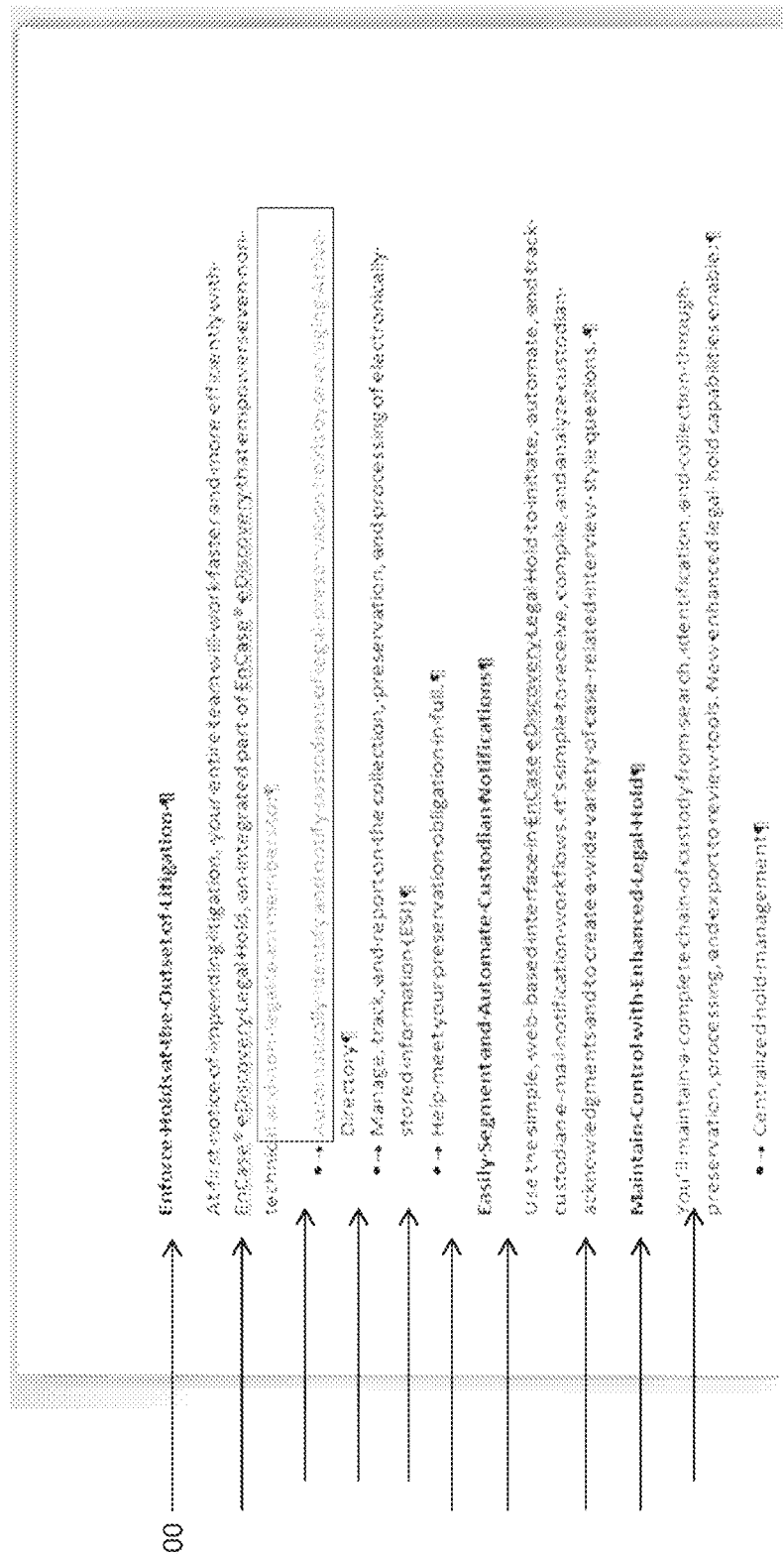
FIG. 5 is a conceptual layout diagram of a graf fact according to one embodiment of the invention.

FIG. 5 is a conceptual layout diagram of a graf fact according to one embodiment of the invention. According to one embodiment, each segment of text marked with an arrow in FIG. 5 (e.g. arrow 500) is stored as a graf fact in the hive 110. In one example, a graf is a series of words that terminate in a natural boundary such as a paragraph or tab stop. Grafs are also referred to as segments. A graf represents an idea. According to one embodiment, certain leading and trailing characters are not included in the indexed graf to make it more likely that repeated sequences are detected. Graffacts are described in further detail in U.S. application Ser. No. 14/024,369, the content of which is incorporated herein by reference.

According to one embodiment, various instances of each fact or link type stored in a particular fact or link table are de-duplicated prior to storing the fact in the table. In this regard, the fact or link ID identifying each fact or link instance is unique in the fact or link table.

Figure 6A:
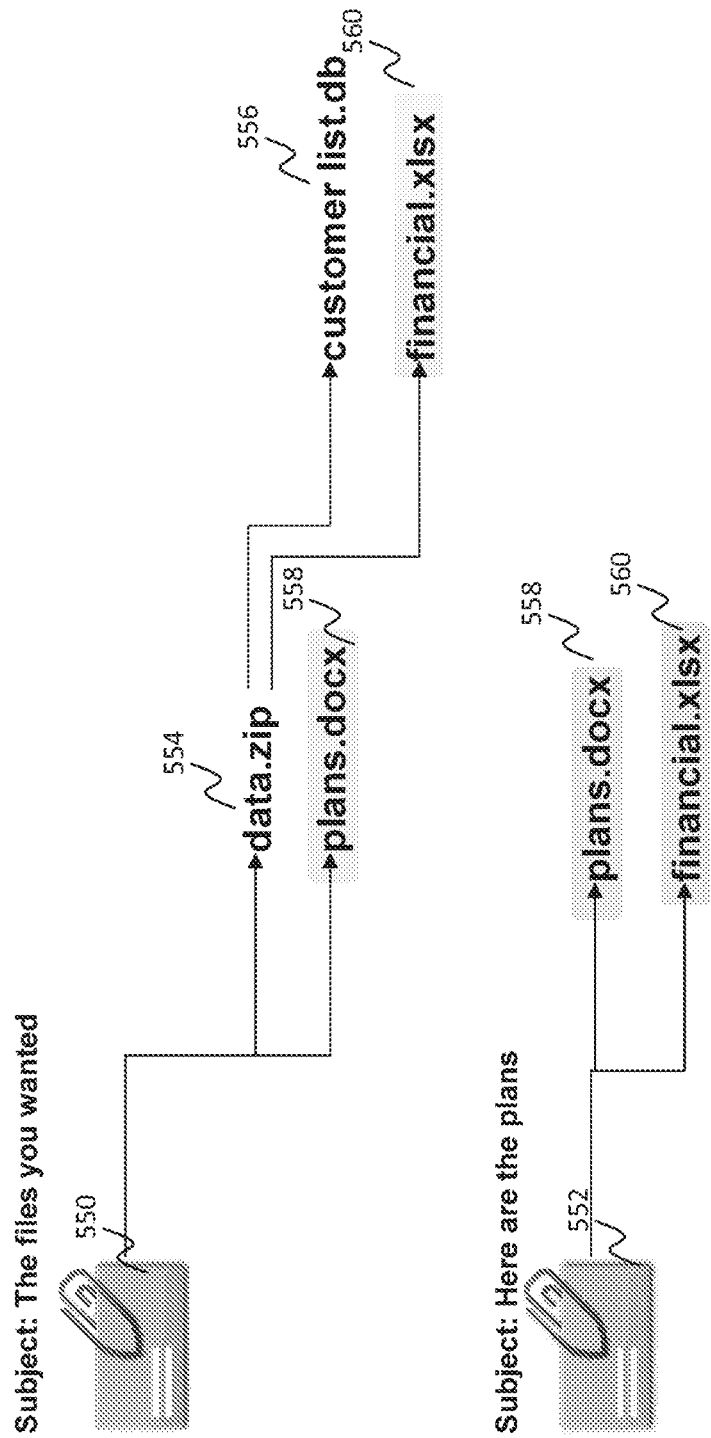
FIG. 6A is a conceptual layout diagram of exemplary emails having attachments according to one embodiment of the invention.

For example, assume that, as shown in the conceptual layout diagram of FIG. 6A, two separate emails 550, 552 having different subjects each have two attachments. In this example, the first email 550 has a first attachment (data. zip) 554 and a second attachment 558. The first attachment 554 contains two files: customer list 556 and financial 560. The second email 552 has the same attachments/files 558, 560 that overlap with the attachments in the first email.

In a typical database system, the second email 552 would store as metadata information on its attachments 558, 560 although the same metadata would be stored for the first email 550, rendering in inefficiencies in use of memory in the prior art. Also, because of the non-duplicated manner in which information is stored in the prior art, in order to find all emails that include documents 558, 560 as attachments, the database system would generally have to query the metadata of each email to determine which attachments are listed for the email.

Figure 6B:
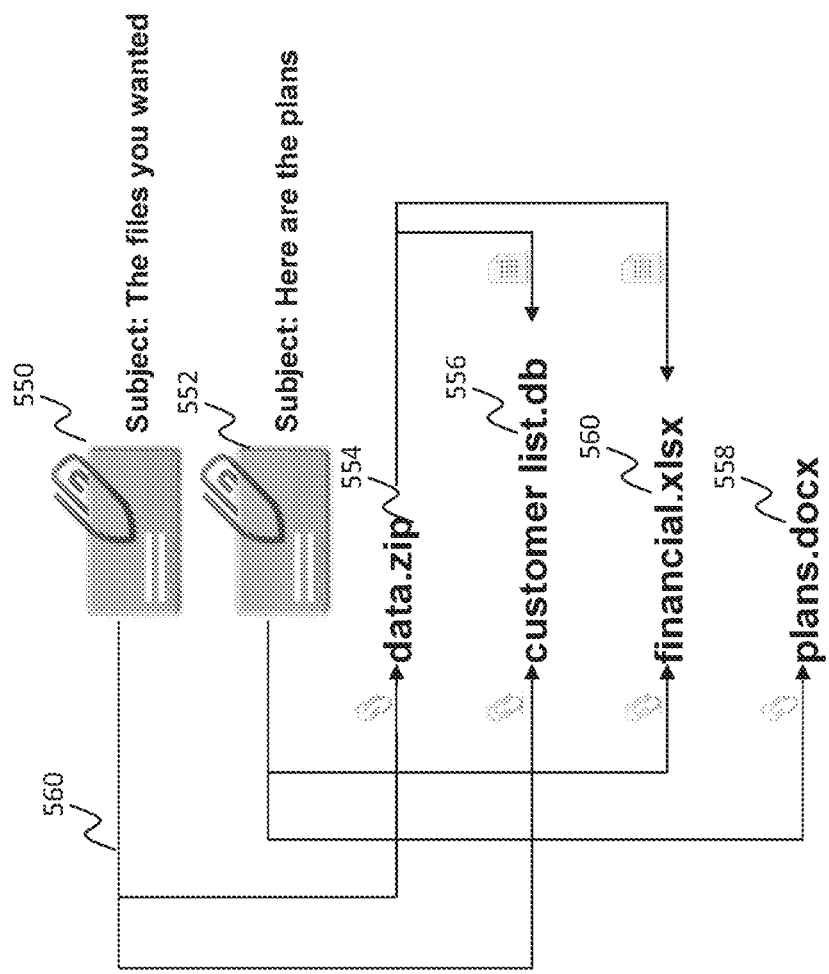
FIG. 6B is an exemplary layout diagram of the hive storing metadata for the emails in FIG. 6A according to one embodiment of the invention.

FIG. 6B is an exemplary layout diagram of the hive storing metadata for the emails 550,552 in FIG. 6A according to one embodiment of the invention. According to one embodiment, when the metadata (i.e. the names of the attachments) are stored in the hive, the files are deduplicated to avoid storing reference to the same attachments, twice. The information on the emails is instead preserved in the form of links 560 between emails and files. More specifically, the fact ID of each email 550, 552 is stored as a separate "email" fact in an email table. The fat ID of each deduplicated file/attachment 554-560 is also stored as a separate "file" fact in a file table. A link table then stores a first link having a first link ID for the tuple (first email 550, data. zip 554), a second link having a second link ID for the tuple (first email 550, customer list 556), a third link having a third link ID for the tuple (second email 552, financial 560), a fourth link having a fourth link ID for the tuple (second email 552, plans 558), a fifth link having a fifth link ID for the tuple (data. zip 554, customer list 556), and a sixth link ID for the tuple (data. zip 554, financial 560).

FIGS. 7A-7B are layout diagrams of two exemplary fact tables that may be stored in the hive 110: a file fact table 600; and a graf fact table 620. The file fact table 600 has various columns including a fact ID column 602, and various metadata columns 604-610, for respectively storing the fact ID and the metadata for each file instance 612,614. According to one embodiment, each fact ID is unique inside its table. In regard to the metadata that may be stored for a file, such metadata may include, for example, the filename 604, file path 606, date in which the file was created 608, and the date in which the file was written 610.

The graf fact table 620 also has a column for storing the fact ID 650 of various graf fact instances 656, 658. The graf fact table further includes columns for storing metadata of a graf, such as, for example, text 652 and length 654 of each graf instance.

Figure 8A:
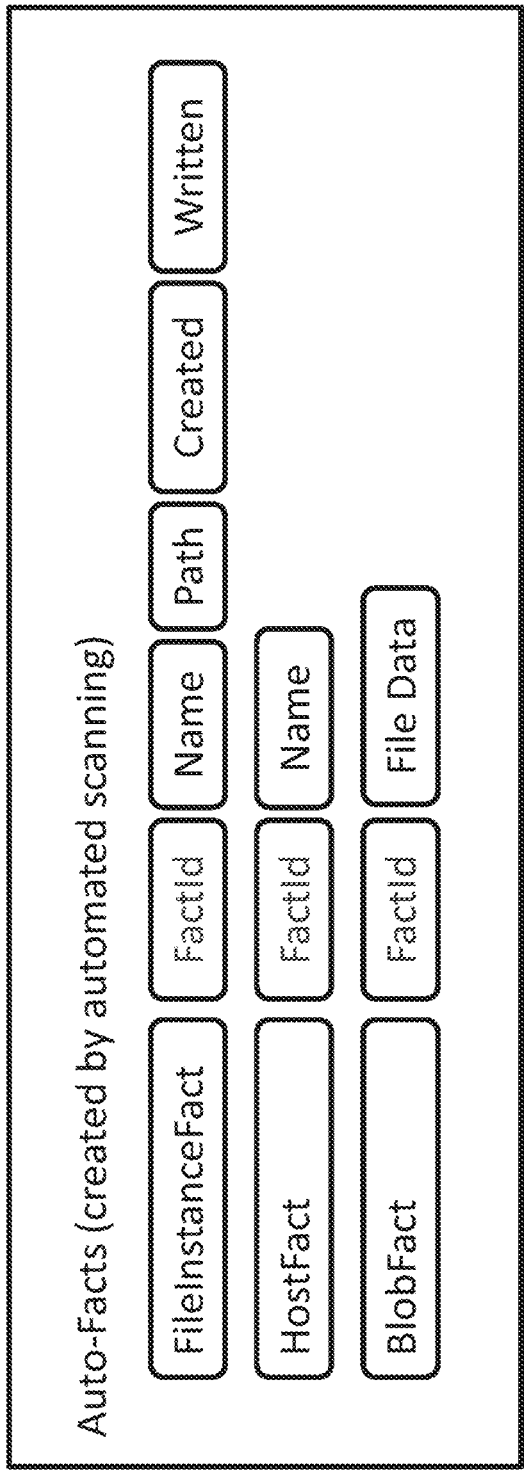
FIGS. 8A and 8B are layout diagrams of different types of facts and associated metadata according to one embodiment of the invention.
Figure 8B:
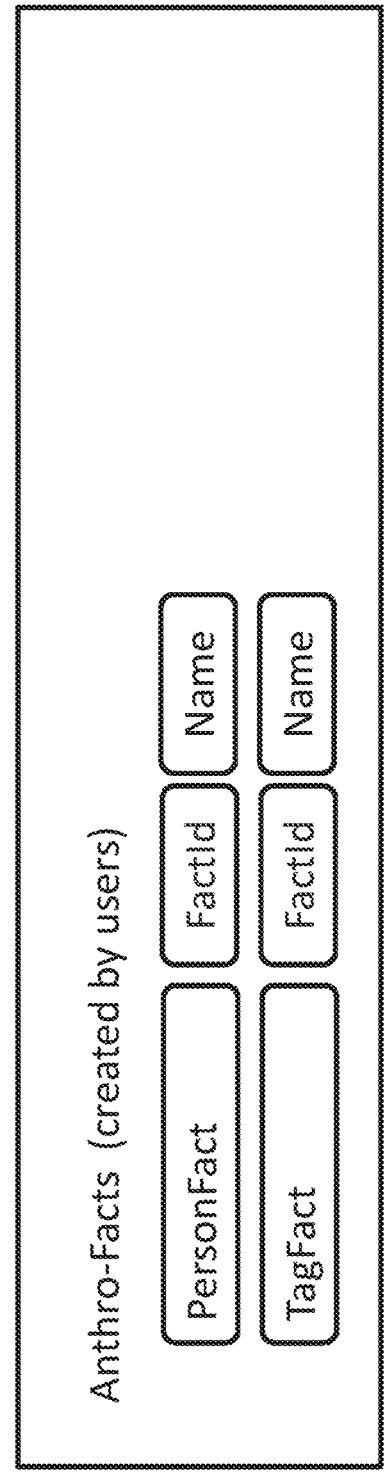

FIGS. 8A and 8B are layout diagrams of different types of facts and associated metadata according to one embodiment of the invention. In addition to files, other types of facts include a host, blob, person, and tag. A host fact may store a name. A blob fact may store file data. A person fact and a tag fact may each store a name. The metadata that may be stored for a particular metadata filed may be, for example, the fact ID of another fact. For example, a "subject" metadata may be stored for an email fact. However, according to one embodiment, instead of storing the actual text that is contained in the subject field of an email, the text is turned into a graf fact, and the fact ID for this graf fact is stored as the "subject" metadata for the email.

According to one embodiment, certain facts (e.g. files, hosts, and blobs) and associated metadata are automatically detected and stored by the software in the appropriate fact table when populating the hive. The associated fact ID is also automatically generated by the software by computing, for example, a hash of the metadata of the fact. This helps ensure that each fact stored in the various tables is unique.

Other facts (e.g. persons and tags) are created by users (e.g. an investigator) upon review of the data that is being investigated. For example, the investigator may detect a name of a person and invoke the software to generate a person fact for storing in a person table. Another fact that may be created by a user is a tag fact. According to one embodiment, the fact ID of facts that are generated by users is a globally unique identifier (GUID) that is independent of the metadata in the fact. Thus, the various fact tables may contain facts with the same metadata, and yet they are still unique in the hive.

Figure 9A:
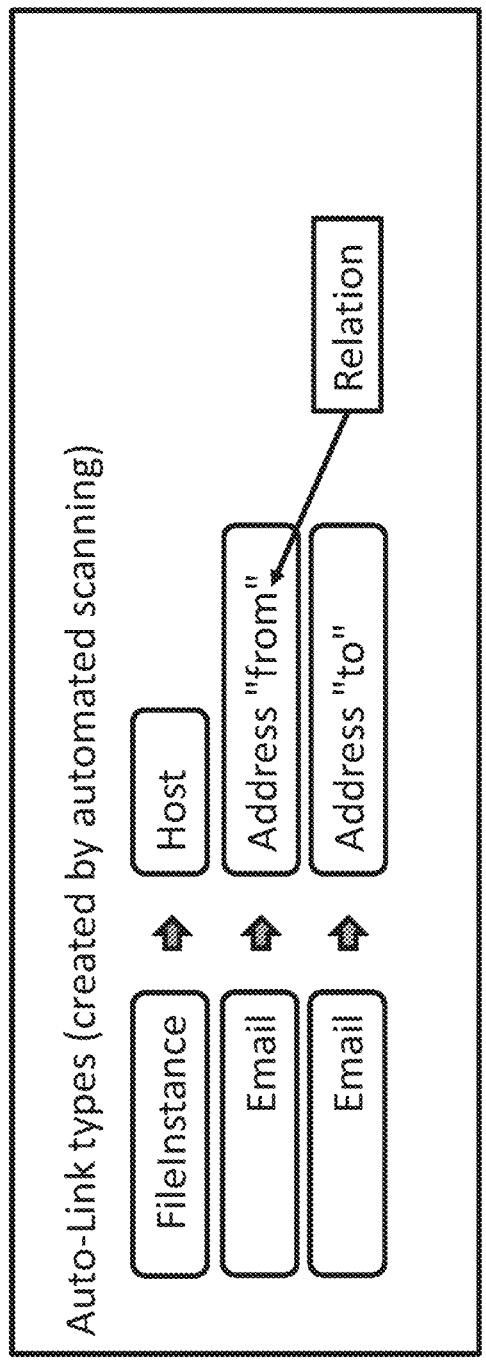
FIGS. 9A and 9B are layout diagrams of different types of links and associated metadata according to one embodiment of the invention.
Figure 9B:
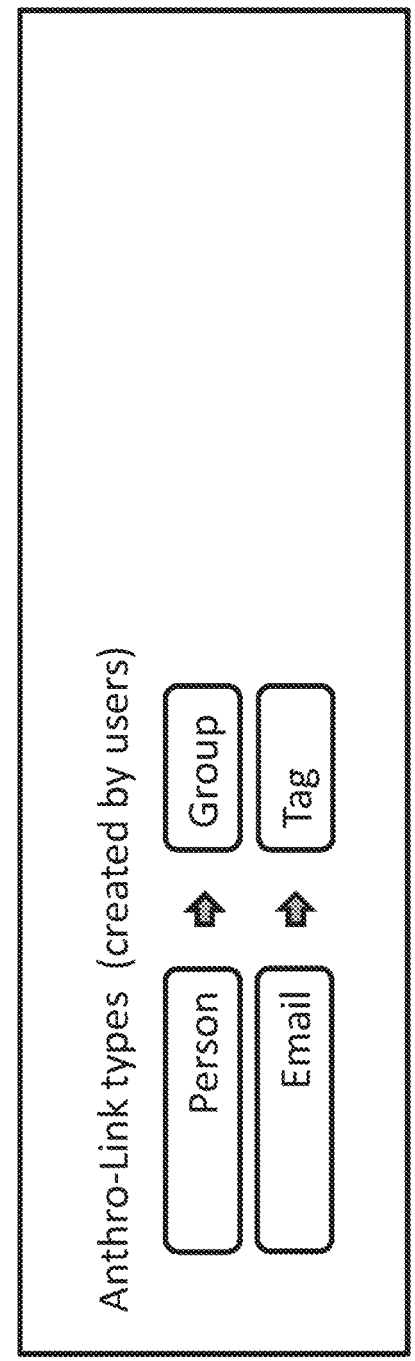

FIGS. 9A and 9B are layout diagrams of different types of links and associated metadata according to one embodiment of the invention. According to one embodiment, a link type describes source and target types of the link along with an optional relation. The relation may be used to distinguish between link types with the same source and target. In the example of FIG. 9A, an email fact is linked to an address fact via a link type "email address." The relation of this link type is "from," to signify that the address was found in a "from" field of the email. According to one embodiment, links are stored in tables like facts. A different table of links may be maintained for every link type.

As with facts, certain links are automatically detected and inserted in the appropriate link table. Other links (e.g. a "members" link that connects a person fact to a group fact), are created by users manually in response to investigating the relevant data.

Figure 10:
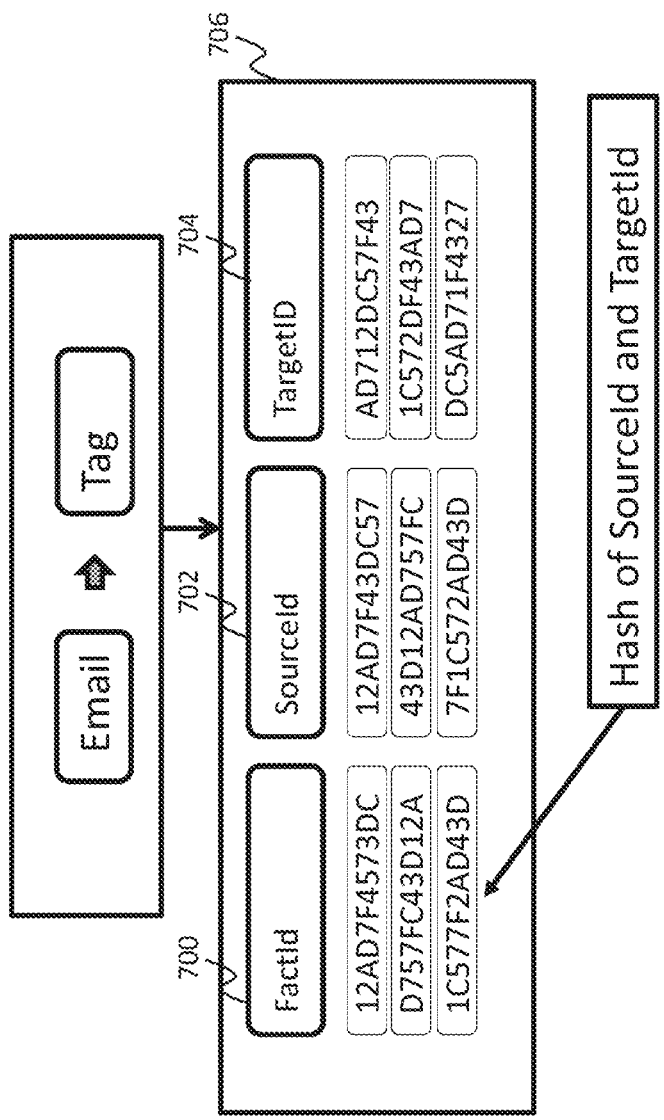
FIG. 10 is a layout diagram of a link table storing links of an email fact linked to a tag fact according to one embodiment of the invention.

FIG. 10 is a layout diagram of a link table storing links of an email fact linked to a tag fact. The link includes a source ID 702 (e.g. fact ID of the email) and a target ID 704 (e.g. fact ID of the tag). According to one embodiment, the fact ID 700 of the link (also referred to as a link ID) is computed by hashing the source ID 702 and the target ID 704. The generated link with its corresponding fact ID 700, source ID 702, and target ID 704, are then then stored in a link table 706 in the hive. According to one embodiment, each link table stores links of the exact same type.

The embodiments of the present invention are not limited to these example facts and links discussed herein. A person of skill in the art will recognize that other types of facts and links may be auto-detected or created by a user as needed during or before an investigation.

Figure 11:
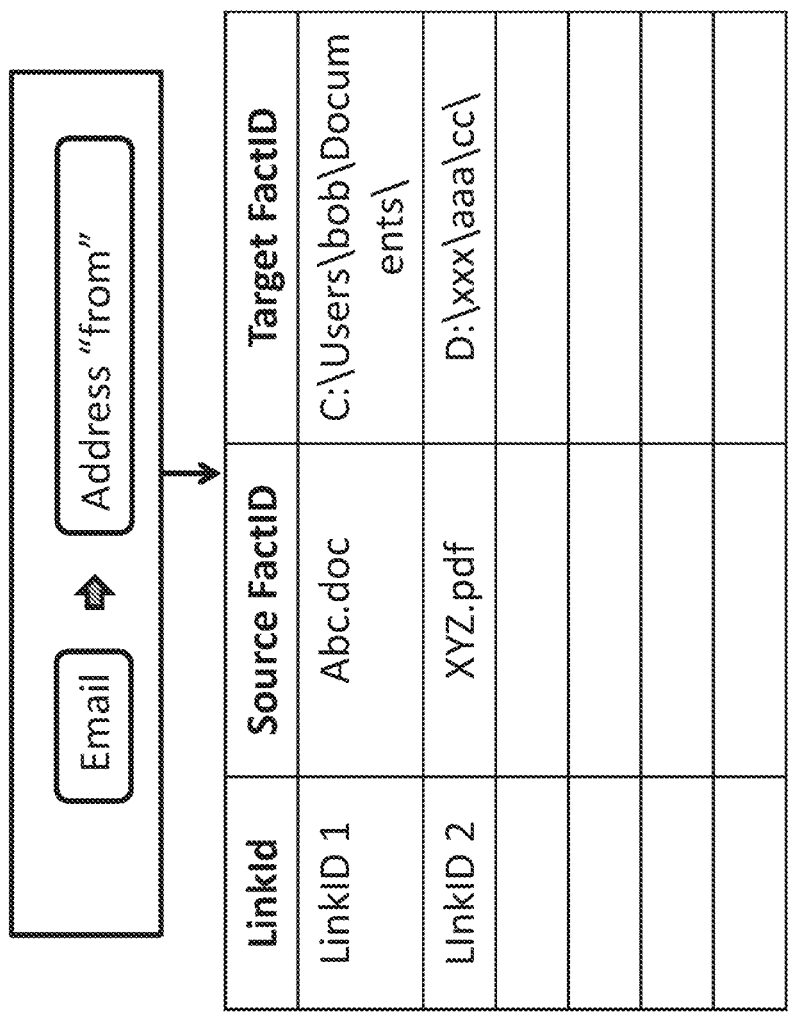
FIG. 11 is a layout diagram of a link table storing links of an email fact linked to an address having a "from" relation according to one embodiment of the invention.

FIG. 11 is a layout diagram of a link table storing links of an email fact linked to an address having a "from" relation. Each link is identified by a link ID, as well as a source fact Id and a target fact ID.

Figure 12:
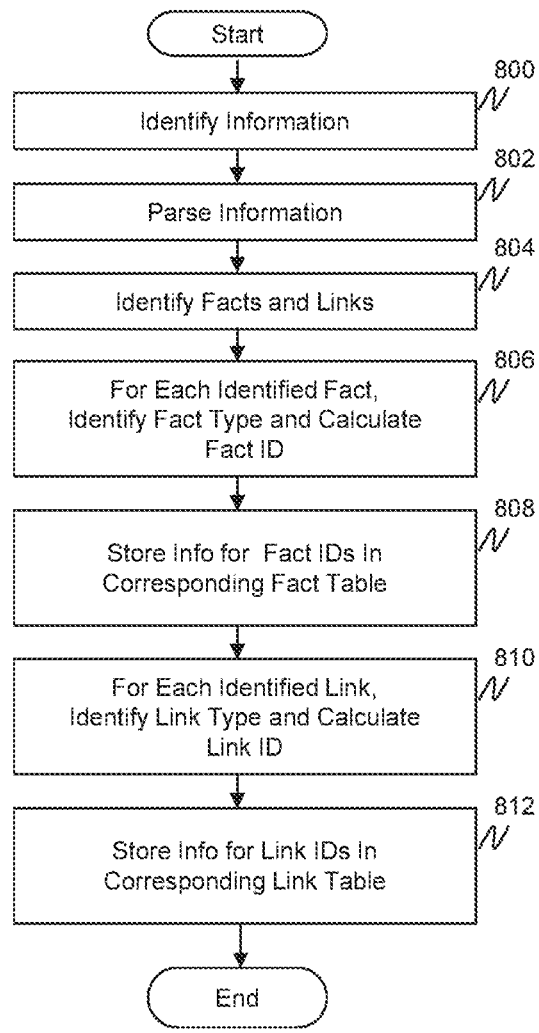
FIG. 12 is a flow diagram of a process for populating the hive according to one embodiment of the invention.

FIG. 12 is a flow diagram of a process for populating the hive according to one embodiment of the invention. The process may be described in terms of a software routine executed by a processor (e.g. a processor in the examining machine 115, secure server 11, target machine 117, or other stand-alone server) based on instructions stored in memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The populating of the hive may be in response to a user command from, for example, the examiner 119. For example, the examiner 119 may identify data from the target device during a computer investigation session, and provide the command to populate the hive for the identified data. The data may be, for example, an email, document, or any other piece of data identified from the target device.

The process starts, and in act 800, the processor identifies information that is to be the basis for populating the hive.

In act 802, the processor parses/scans the information, and identifies, in act 804, facts and links based on the parsing.

For example, if the information that is being parsed is an email, the processor may generate an email fact based on the automatic scanning, and further generate address facts for each email address encountered in the email along with a "to" and "from" links between the email fact and the address facts. According to some embodiments, the facts and links may be manually identified by the examiner 119 based on analysis of the information. For example, the examiner 119 may want to generate a specific tag fact (e.g. "interesting") and link the email to the tag with an "interesting email" link type.

In act 806, the processor identifies the fact type for each identified fact, and further generates a fact ID for the fact. The fact ID for an automatically identified fact is, according to one embodiment, a hash value of the fact. The hash value may be computed, for example, using any hash algorithm conventional in the art. If the fact is one that is identified by the examiner 119, the fact ID is a global unique identifier that may be generated by the processor according to any conventional mechanism.

In act 808, the information for the fact is stored in a fact table associated with the fact type. The information may be, for example, metadata information of the fact which is stored in the fact table in association with the fact ID.

In act 810, the processor identifies the link type for each identified link, and further generates a link ID for the link. The link ID for an automatically identified link is, according to one embodiment, a hash value computed based on the fact IDs of the two facts that are linked together.

In act 812, the information for the link ID is stored in a link table associated with the identified link type. According to one embodiment, the information that is stored in the link table is the link ID of each link, as well as the source and target fact IDs that are linked together by each link.

For purposes of illustration, assume that an email is to be processed by the examining machine 115 for populating the hive 110. In this regard, the email is stored as a fact, and various fields of the email are turned into corresponding facts that are linked to the email fact. The examining machine may automatically identify the various fields in the email and automatically generate the corresponding link facts for populating the hive. For example, an email fact may be generated for the email and stored in the hive in an email table. The text in the "subject" field of the email may also be extracted and turned into a graf fact. The fact Id for the graf fact is then stored as the "subject" metadata in the email table for this particular email.

The email that is processed contains email fields. Every email address listed in the "To" field is turned into an email address fact, and a "To" link generated between the email fact and each email address fact. Thus, if the email has five email addresses listed in the "To" field, five separate "To" links are generated between the email fact and each of the email address facts. The same is done for the email address listed in the "From" field.

The email that is processed further contains a body. According to one embodiment, the body of the email may be turned into a document fact, and the fact ID of the document fact stored as the "body" metadata in the email table for the particular email.

Figure 13:
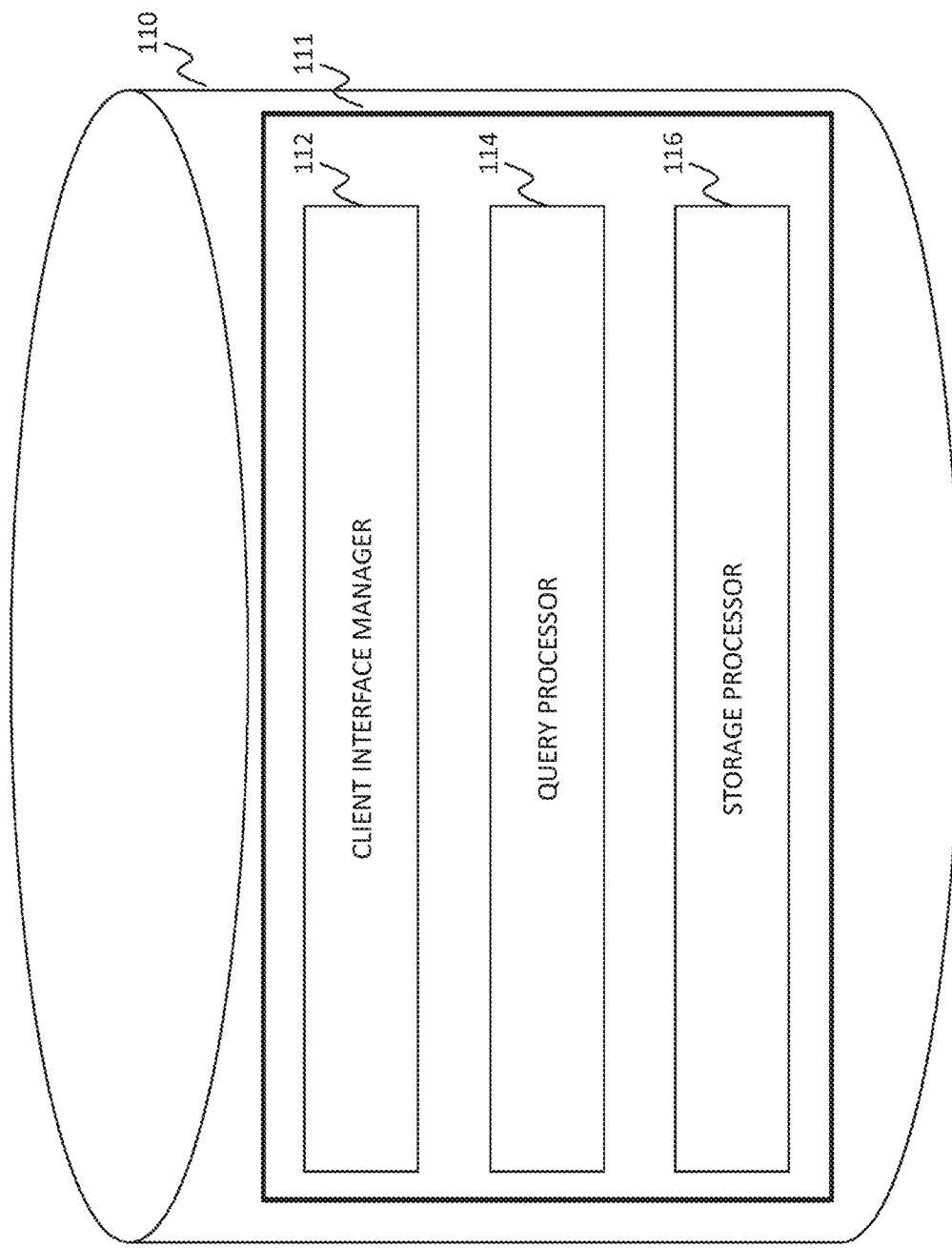
FIG. 13 is a conceptual diagram of various modules that may reside in the DB server 111 controlling the hive according to one embodiment of the invention.

FIG. 13 is a conceptual diagram of various modules that may reside in the DB server 111 controlling the hive according to one embodiment of the invention. The DB server 111 may include a client interface manager 112, query processor 114, and storage processor 116. The client interface manager 112 is configured to interface with clients to receive requests and provide outputs in response to such requests. An exemplary client that may place requests to the hive is the examining machine 115. The examining machine may place requests for populating the hive or running searches of the hive.

The query processor 114 is configured to process DB commands from the client accessing the hive. Such commands may be for adding entries to the tables in the hive, retrieving data matching a particular query, and/or the like.

The storage processor 116 is configured to interface with the disks and/or disk arrays storing the various tables of the hive to write, update, delete, retrieve, etc. data from the disks and/or disk arrays.

According to one embodiment, the EQL query language is used to place queries to the hive 110 via the DB server 111. The search queries generated using EQL take advantage of the structure of the hive to describe the type of data that is desired to be identified. According to one embodiment, any fact in the hive may be searched using an EQL search query. In this regard, EQL provides a formal syntax for allowing the definition of the search queries, but the search queries are designed to be understood by even non-programmers.

According to one embodiment, EQL provides for fact filters. A fact filter specifies a set of conditions for finding facts. Each filter encloses a group of gates that are separated by a semi-colon. A person of skill in the art should appreciate, however, that a gate may be marked by other punctuation marks (or any other symbol), and is not limited to semi-colons. According to one embodiment, each gate in the filter must be passed through in order for the object in question to pass the filter condition. An exemplary fact filter may be as follows:

```
facts SpecificPerson {
    StartDate matches 2010..;        // Gate 1
    Name matches wildcard "d*"       // Gate 2
    Department matches "Finance";    // Gate 3
}
```

According to one embodiment, EQL provides for "match" blocks that are interpreted as flexible AND/OR boolean statements. According to one embodiment, every gate inside a match block is an independent condition, but the various gates inside the block must meet a top match constraint.

Exemplary match constraints include:
match all
    all enclosed statements must be true (equivalent to and)
match any
    Same as match 1
    At least 1 of the enclosed statements must be true (equivalent to or)
match none
    None of the enclosed statements may be true (equivalent to not (A or B or C . . . ))
match number
    number enclosed statements must be true (match 1 is equivalent to or)

Example 1: The Person Must Match 2 of the 3 Conditions

```
facts[PersonFact] SpecificPerson {
    match 2 {
        Name matches "Denise";
        StartDate matches 2010..;
        Department matches "Finance";
    }
}
```

In the above Example 1, an examining machine 115 interpreting the search query causes identification of a person fact that is stored in the hive 110, where the fact contains metadata that matches 2 of the 3 conditions specified in the match block.

Example 2: The Person Must Match all Conditions

```
facts[PersonFact] Comissioned {
    match all {
        StartDate matches . . 90 days before now; //
        On the job for at least 90 days
        Department matches ["Marketing", "Sales"];
    }
}
```

In the above Example 2, an examining machine 115 interpreting the search query causes identification of a person fact that is stored in the hive 110, where the fact contains metadata that matches 2 of the 3 conditions specified in the match block.

According to one embodiment, EQL also provides for a link filter to test whether a fact has any links to another fact. Below is an example of a link filter according to one embodiment of the invention.

Example 3: File Instances Must be Tagged

```
links Tagged {
    type matches FileInstanceFact with TagFact;
}
facts[FileInstanceFact] TaggedFileInstance {
    Tagged;
}
```

In the above Example 3, the examining machine 115 interpreting the search query causes identification of a file instance fact that is stored in the hive 110, where the fact is linked to a tag fact.

According to one embodiment, EQL further allows for range queries without the use of typical mathematical symbols. For example, specific time intervals may be defined such as, for example:
    interval Years=2 years;
    interval Months=1 months;
    interval Weeks=5 weeks;
    interval Days=28 days;
    interval Hours=12 hours;
    interval Minutes 18 minutes;
    interval Seconds=58 seconds;

The intervals may be combined with dates to create another date that is relative to the first using the keywords "before" or "after." According to one embodiment, the accuracy of the interval is used to truncate the resulting date. For instance, if a year interval is used, the resulting date is truncated to the nearest even year. If a month interval is specified, the date is truncated to the nearest start month, and so on.

```
date CaseStart = 2010-05-12;
date CaseEnd = 2 years after CaseStart; // Result      2012-01-01
date TroubleBegan = 11 months before CaseStart; // Result  2009-05-01
```

Ranges may also be defined in EQL. Ranges combine a min and a max value together to facilitate comparisons. Ranges may be specified for the following types:
   integer
   real
   date
   Ipaddress According to one embodiment, EQL allows the use of two-dot ellipsis (..) in the following ways:
1) Before a value to indicate less than or equal to the value
2) Between two values to indicate a value greater than or equal to left value AND less than or equal to the right value
3) After a value to indicate greater than or equal to the value

```
integer range GoodSize = 10..20;       // Between 10 and 20 inclusive
date range CaseDateRange = 2010-10;    // From November-2010 to
                                       the present
real range EntropyRange = 3.5 .. 7.0;  // >= 3.5 and <= 7.0
date range LastYear =                  // From last year to the present
1 years before now..;
```

According to one embodiment, a minimal search query contains a filter and a "main" section that calls the filter. A filter is not activated until it is called in the "main" section.

Figure 14:
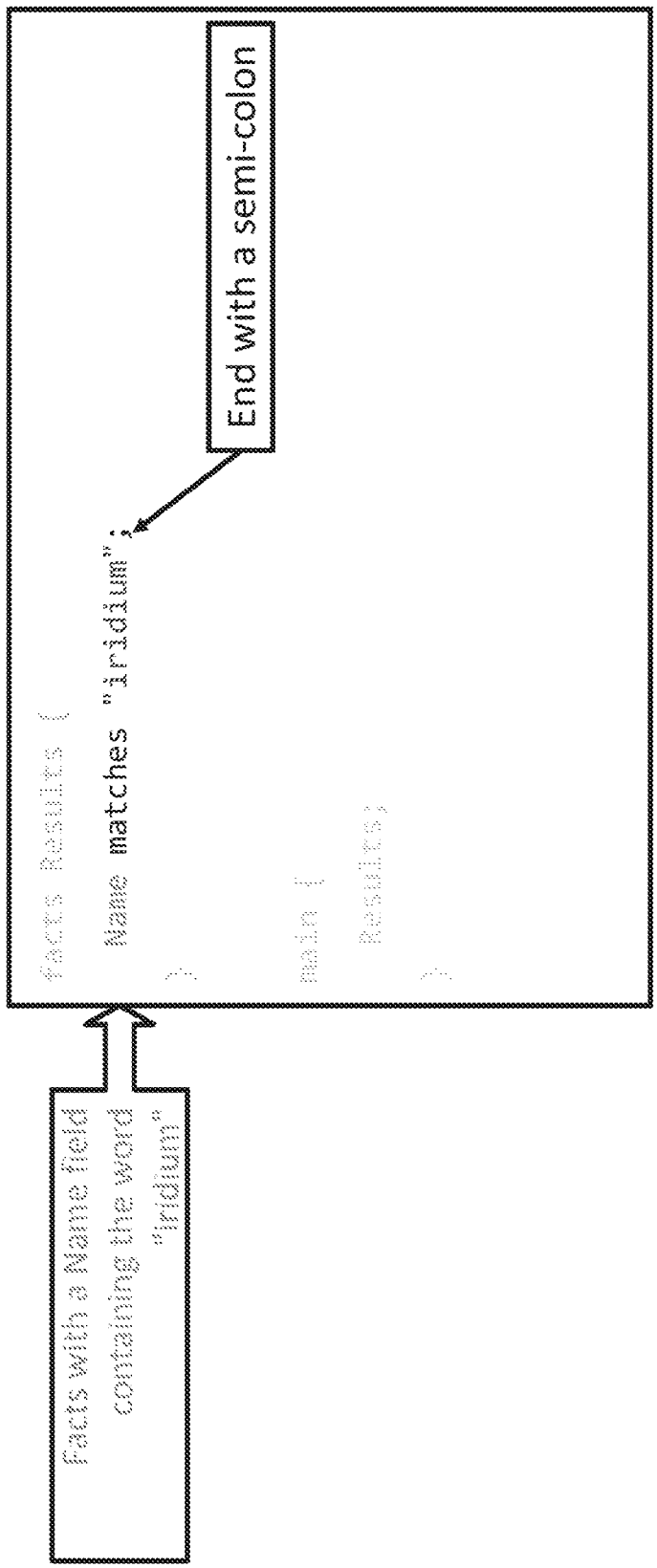
FIG. 14 is an example of a "results" fact filter and a call to the "results" fact filter from a "main" section according to one embodiment of the invention.

FIG. 14 is an example of a "results" fact filter and a call to the "results" fact filter from a "main" section. The fact filter in the example of FIG. 14 is interpreted as requiring a fact with a "name" field containing the word "iridium."

Given the unique hive structure and EQL search language, queries may be generated that allow the examining machine 115 to search the hive by traversing links to find matches of specified conditions. The use of gates and match blocks in EQL eliminates the need to use AND/OR boolean conditions and nested parenthesis. Thus, as a person of skill in the art should appreciate, a lot of the complexity in traditional search queries due to use of such statements is eliminated using EQL.

According to one embodiment, the structure of the hive, along with the EQL search language used to query the hive, provide a mechanism to query relationships or links between facts that may not be possible, or quite complicated, according to traditional database architectures and associated query languages. For example, an investigator may want to collect all emails from a particular individual. This may be done, for example, by formulating an EQL search that collects all emails that are linked to email addresses that are in turn linked to the particular individual. In processing such a search, the DB server may search a person fact table and identify the fact ID of a person having a particular name as the metadata. With this fact ID, the DB server may then search a PersonEmailAddress link table to find the fact IDs of all email addresses linked to the fact ID of the particular individual. With the fact IDS of all email addresses for the particular individual, the DB server may then search an EmailWithEmailAddress link table to find the fact ID of all emails linked to the fact ID of the identified email addresses, and which have the relation "from." The metadata of the emails with the identified fact IDs are then output to the investigator.

Although this invention has been described in certain specific embodiments, those skilled in the art will have no difficulty devising variations to the described embodiments which in no way depart from the scope and spirit of the present invention. Furthermore, to those skilled in the various arts, the invention itself herein will suggest solutions to other tasks and adaptations for other applications. Thus, the present embodiments of the invention should be considered in all respects as illustrative and not restrictive.

We claim as follows:

1. A method for conducting an investigation of one or more target devices by an examining device wherein information extracted from the target devices is stored and organized on a hardware data storage device that is communicatively coupled to the examining device and is separate from the target devices, the method comprising:
   extracting, by a processor of the examining device, information stored in a first target device, the extracted information including pieces of data of a first type and pieces of data of a second type;
   storing, by the processor in the hardware data storage device, the pieces of data of the first type in a first table and the pieces of data of the second type in a second table, each of the pieces of data of the first type and the second type being stored with corresponding unique identifiers and corresponding metadata;
   generating, by the processor, one or more links, each link linking one of the pieces of data of the first type to one of the pieces of data of the second type;
   storing, by the processor in the hardware data storage device, each link in a third table, wherein each link is stored with a corresponding unique identifier;
   identifying, by the processor in response to a received query, a first piece of data in the first table, wherein the received query comprises a plurality of conditions, wherein each condition of the plurality of conditions is marked by a gate, wherein the plurality of conditions is evaluated to guide access to the first table;
   identifying, by the processor, one or more of the links in the third table which are linked to the first piece of data, wherein the plurality of conditions is evaluated to guide access to the third table, wherein the one or more of the links of the third table are evaluated to determine the second table;
   retrieving, by the processor from the second table, one or more of the pieces of data of the second type which are linked to the first piece of data by the one or more identified links;
   outputting, by the processor, the one or more retrieved pieces of data of the second type.

2. The method of claim 1,
   wherein the query describes a filter, the filter including a plurality of conditions, wherein each of the conditions is enclosed in a gate ending with a particular punctuation mark;
   wherein retrieving the one or more of the pieces of data of the second type comprises accessing, by the examining device, the first table, the second table and the third table;
      searching, by the examining device, the first table, the second table and the third table for identifying a match for each of the conditions; and
      returning, by the examining device, search results in response to identifying the match for each of the conditions in the data retrieved from the tables stored in the hardware data storage device.

3. The method of claim 2, wherein the filter includes a boolean match constraint on the plurality of conditions.

4. The method of claim 3, wherein the boolean match constraint is selected from the group including: match all; match any; match none; match a specified number.

5. The method of claim 1, wherein the corresponding unique identifier for each piece of data of the first type is based on the corresponding metadata of each piece of data of the first type.

6. The method of claim 1, wherein the corresponding unique identifier for each piece of data of the first type is globally unique and is independent of the corresponding metadata of each piece of data of the first type.

7. The method of claim 1, wherein the extracted information including pieces of data of one or more additional types, the method further comprising storing, by the processor in the hardware data storage device, the pieces of data of each additional type in a corresponding additional table, each of the pieces of data of the one or more additional types being stored with corresponding unique identifiers and corresponding metadata.

8. The method of claim 1, wherein the link table includes links between pieces of data in two or more different pairs of the first table, the second table, the third table and the one or more additional tables.

9. The method of claim 1, wherein the pieces of data are extracted from the first target device and one or more additional target devices.

10. A computer investigation system comprising:
an examining machine having a hardware processor and an interface configured to access one or more target devices;
a hardware data storage device communicatively coupled to the examining machine, the hardware data storage device storing a plurality of tables;
wherein the hardware processor is configured to:
extract information stored in a first target device, the extracted information including pieces of data of a first type and pieces of data of a second type;
store, in the hardware data storage device, the pieces of data of the first type in a first table and the pieces of data of the second type in a second table, each of the pieces of data of the first type and the second type being stored with corresponding unique identifiers and corresponding metadata;
generate one or more links, each link linking one of the pieces of data of the first type to one of the pieces of data of the second type;
store, in the hardware data storage device, each link in a third table, wherein each link is stored with a corresponding unique identifier;
identify, in response to a received query, a first piece of data in the first table, wherein the received query comprises a plurality of conditions, wherein each condition of the plurality of conditions is marked by a gate, wherein the plurality of conditions is evaluated to guide access to the first table;
identify one or more of the links in the third table which are linked to the first piece of data, wherein the plurality of conditions is evaluated to guide access to the third table, wherein the one or more of the links of the third table are evaluated to determine the second table;
retrieve, from the second table, one or more of the pieces of data of the second type which are linked to the first piece of data by the one or more identified links;
output the one or more retrieved pieces of data of the second type.

11. The computer investigation system of claim 10,
wherein the query describes a filter, the filter including a plurality of conditions, wherein each of the conditions is enclosed in a gate ending with a particular punctuation mark;
wherein retrieving the one or more of the pieces of data of the second type comprises accessing, by the examining device, the first table, the second table and the third table;
searching, by the examining device, the first table, the second table and the third table for identifying a match for each of the conditions; and
returning, by the examining device, search results in response to identifying the match for each of the conditions in the data retrieved from the tables stored in the hardware data storage device.

12. The computer investigation system of claim 11, wherein the filter includes a boolean match constraint on the plurality of conditions.

13. The computer investigation system of claim 12, wherein the boolean match constraint is selected from the group including: match all; match any; match none; match a specified number.

14. The computer investigation system of claim 10, wherein the corresponding unique identifier for each piece of data of the second type is based on the corresponding metadata of each piece of data of the second type.

15. The computer investigation system of claim 10, wherein the corresponding unique identifier for each piece of data of the first type is globally unique and is independent of the corresponding metadata of each piece of data of the first type.

16. The computer investigation system of claim 10, wherein the extracted information including pieces of data of one or more additional types, wherein the hardware processor is further configured to store, in the hardware data storage device, the pieces of data of each additional type in a corresponding additional table, each of the pieces of data of the one or more additional types being stored with corresponding unique identifiers and corresponding metadata.

17. The computer investigation system of claim 10, wherein the link table includes links between pieces of data in two or more different pairs of the first table, the second table, the third table and the one or more additional tables.

18. The computer investigation system of claim 10, wherein the pieces of data are extracted from the first target device and one or more additional target devices.

19. A computer program product for conducting an investigation of one or more target devices by an examining device wherein information extracted from the target devices is stored and organized on a hardware data storage device that is communicatively coupled to the examining device and is separate from the target devices, the computer program product comprising a non-transitory computer-readable medium storing instructions executable by one or more hardware processors to cause the hardware processors to perform:
extracting information stored in a first target device, the extracted information including pieces of data of a first type and pieces of data of a second type;
storing, in the hardware data storage device, the pieces of data of the first type in a first table and the pieces of data of the second type in a second table, each of the pieces of data of the first type and the second type being stored with corresponding unique identifiers and corresponding metadata;

generating one or more links, each link linking one of the pieces of data of the first type to one of the pieces of data of the second type;

storing, in the hardware data storage device, each link in a third table, wherein each link is stored with a corresponding unique identifier;

identifying, by the processor in response to a received query, a first piece of data in the first table, wherein the received query comprises a plurality of conditions, wherein each condition of the plurality of conditions is marked by a gate, wherein the plurality of conditions is evaluated to guide access to the first table;

identifying, by the processor, one or more of the links in the third table which are linked to the first piece of data, wherein the plurality of conditions is evaluated to guide access to the third table, wherein the one or more of the links of the third table are evaluated to determine the second table;

retrieving, from the second table, one or more of the pieces of data of the second type which are linked to the first piece of data by the one or more identified links; and outputting the one or more retrieved pieces of data of the second type.

20. The computer program product of claim 19, wherein the query describes a filter, the filter including a plurality of conditions, wherein each of the conditions is enclosed in a gate ending with a particular punctuation mark;

wherein retrieving the one or more of the pieces of data of the second type comprises accessing the first table, the second table and the third table;

searching the first table, the second table and the third table for identifying a match for each of the conditions; and returning search results in response to identifying the match for each of the conditions in the data retrieved from the tables stored in the hardware data storage device.

* * * * *